United States Patent
Prabhakaran et al.

(10) Patent No.: US 11,799,952 B2
(45) Date of Patent: Oct. 24, 2023

(54) COMPUTING RESOURCE DISCOVERY AND ALLOCATION

(71) Applicant: Intel Corporation, Santa Clara, CA (US)

(72) Inventors: Suraj Prabhakaran, Aachen (DE); Kshitij A. Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 957 days.

(21) Appl. No.: 16/241,891

(22) Filed: Jan. 7, 2019

(65) Prior Publication Data
US 2019/0208009 A1    Jul. 4, 2019

(51) Int. Cl.
| | | |
|---|---|---|
| *H04L 67/1036* | (2022.01) | |
| *H04L 67/1004* | (2022.01) | |
| *H04L 9/40* | (2022.01) | |
| *H04L 41/046* | (2022.01) | |
| *H04L 67/51* | (2022.01) | |
| *H04L 67/61* | (2022.01) | |

(52) U.S. Cl.
CPC ........ *H04L 67/1036* (2013.01); *H04L 41/046* (2013.01); *H04L 63/08* (2013.01); *H04L 67/1004* (2013.01); *H04L 67/51* (2022.05); *H04L 67/61* (2022.05)

(58) Field of Classification Search
CPC ... H04L 67/1036; H04L 41/046; H04L 63/08; H04L 67/1004; H04L 67/16; H04L 67/322
See application file for complete search history.

(56) References Cited

U.S. PATENT DOCUMENTS

| | | | | |
|---|---|---|---|---|
| 8,260,893 B1 * | 9/2012 | Bandhole | ............. | G06F 9/5083 |
| | | | | 709/224 |
| 9,819,626 B1 * | 11/2017 | Berg | ................... | H04L 41/5006 |
| 10,439,814 B1 * | 10/2019 | Grubin | .................. | H04L 9/0894 |
| 10,637,915 B1 * | 4/2020 | Ward | .................. | H04L 67/1008 |
| 10,659,523 B1 * | 5/2020 | Joseph | .................... | H04L 67/10 |
| 10,791,168 B1 * | 9/2020 | Dilley | ..................... | H04L 41/22 |
| 10,862,821 B1 * | 12/2020 | Jonsson | .................. | H04L 67/10 |
| 10,936,191 B1 * | 3/2021 | Lakshminarayanan | | ...................... |
| | | | | G06F 3/067 |
| 2006/0150158 A1 * | 7/2006 | Fellenstein | ......... | G06F 11/3495 |
| | | | | 714/E11.193 |
| 2007/0011281 A1 * | 1/2007 | Jhoney | .................... | G06Q 10/10 |
| | | | | 709/220 |
| 2007/0233827 A1 * | 10/2007 | McKnight | ............... | H04L 67/16 |
| | | | | 709/223 |

(Continued)

OTHER PUBLICATIONS

Kennedy, Patrick, "Explaining the Baseboard Management Controller or BMC is Servers", Sep. 27, 2018, 10 pages.

*Primary Examiner* — Jimmy H Tran
(74) *Attorney, Agent, or Firm* — Compass IP Law PC

(57) ABSTRACT

A computing cluster can receive a request to perform a workload from a client. The request can include a service discovery agent. If the request is authenticated and permitted on the computing cluster, the service discovery agent is executed. Execution of the service discovery agent can lead to discovery of resource capabilities of the cluster and selection of the appropriate resource based on performance requirements. The selected resource can be deployed for execution of the workload.

22 Claims, 8 Drawing Sheets

(56) References Cited

U.S. PATENT DOCUMENTS

| | | | |
|---|---|---|---|
| 2009/0228892 A1* | 9/2009 | Di Luoffo | G06F 9/5088 718/104 |
| 2012/0066487 A1* | 3/2012 | Brown | H04L 67/1027 709/224 |
| 2012/0233315 A1* | 9/2012 | Hoffman | G06F 9/5072 709/224 |
| 2013/0227140 A1* | 8/2013 | Hinton | H04L 67/568 709/225 |
| 2013/0305013 A1 | 11/2013 | Ebersole | |
| 2014/0052864 A1* | 2/2014 | Van Der Linden | H04L 47/70 709/226 |
| 2014/0101306 A1* | 4/2014 | Murgia | H04L 47/125 709/224 |
| 2014/0108665 A1* | 4/2014 | Arora | H04L 67/563 709/227 |
| 2014/0237550 A1* | 8/2014 | Anderson | G06F 9/45533 726/22 |
| 2015/0355946 A1* | 12/2015 | Kang | G06F 9/5072 718/104 |
| 2016/0014039 A1* | 1/2016 | Reddy | H04L 43/16 709/224 |
| 2017/0141958 A1* | 5/2017 | Morley | H04L 41/5051 |
| 2017/0149931 A1* | 5/2017 | Lochhead | H04L 41/0896 |
| 2018/0165110 A1* | 6/2018 | Htay | G06F 8/65 |
| 2018/0173567 A1* | 6/2018 | Olshefski | G06F 12/1009 |
| 2018/0241842 A1* | 8/2018 | Kumar | H04L 47/805 |
| 2018/0278602 A1* | 9/2018 | Koushik | H04L 63/0853 |
| 2018/0321981 A1* | 11/2018 | McCormick | H04L 5/0035 |
| 2019/0004780 A1* | 1/2019 | Arumugam | G06F 8/60 |
| 2019/0005576 A1* | 1/2019 | Mick | H04L 41/5054 |
| 2019/0028355 A1* | 1/2019 | Subramanian | H04L 67/51 |
| 2019/0028552 A1* | 1/2019 | Johnson, II | H04L 67/146 |
| 2019/0158617 A1* | 5/2019 | åström | H04W 76/15 |
| 2019/0227845 A1* | 7/2019 | Sridhar | G06F 9/5044 |
| 2019/0361626 A1* | 11/2019 | East | G06F 3/0653 |
| 2019/0379590 A1* | 12/2019 | Rimar | G06F 16/9024 |
| 2020/0167197 A1* | 5/2020 | Bahramshahry | G06F 9/4887 |
| 2020/0204463 A1* | 6/2020 | Guan | G06F 16/27 |
| 2020/0334068 A1* | 10/2020 | Krishnamurthy | G06F 11/30 |
| 2020/0371846 A1* | 11/2020 | Halen | H04L 67/1023 |
| 2021/0119864 A1* | 4/2021 | Tiwari | H04L 41/0895 |
| 2021/0194772 A1* | 6/2021 | Cencini | G06F 1/189 |
| 2021/0234920 A1* | 7/2021 | Chauhan | H04L 12/6418 |
| 2021/0349760 A1* | 11/2021 | Siddappa | G06F 9/5077 |
| 2022/0019474 A1* | 1/2022 | Kumar | G06F 9/5061 |
| 2022/0052993 A1* | 2/2022 | Zhuravlev | H04L 67/1097 |
| 2022/0075848 A1* | 3/2022 | Duggal | H04L 63/0263 |
| 2022/0091893 A1* | 3/2022 | Gold | G06N 20/00 |
| 2022/0091897 A1* | 3/2022 | Butterworth | G06F 8/433 |
| 2022/0223296 A1* | 7/2022 | Florissi | G16H 50/70 |
| 2022/0318066 A1* | 10/2022 | Bartfai-Walcott | G06F 9/5083 |
| 2022/0350679 A1* | 11/2022 | Sukhomlinov | G06F 9/5072 |

* cited by examiner

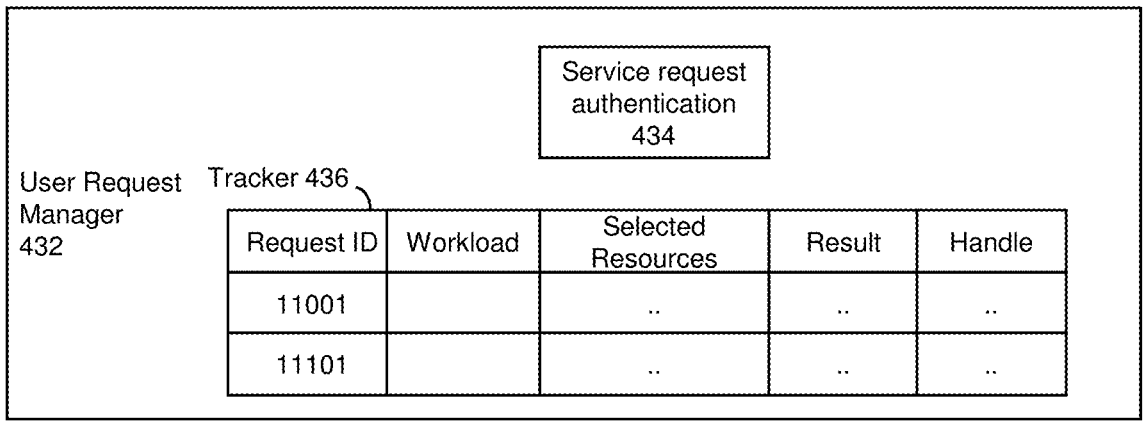
FIG. 4B
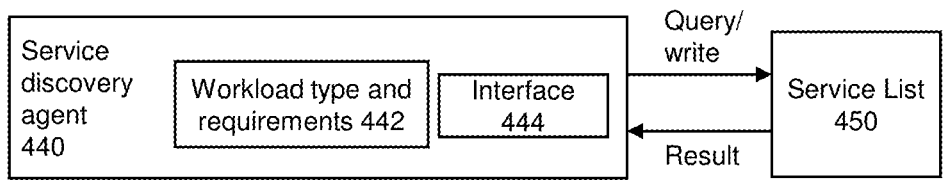
FIG. 4C
| Workload type ID | Latency | Cost | Service Application | Resource identifier |
|---|---|---|---|---|
| 001..001 | .. | .. | .. | .. |
| 001..111 | .. | .. | .. | .. |
FIG. 4D

COMPUTING RESOURCE DISCOVERY AND ALLOCATION

TECHNICAL FIELD

Various examples are described herein that relate to computing resource selection and allocation.

BACKGROUND

Data centers provide vast processing, storage, and networking resources to users. For example, client devices can leverage data centers to perform image processing, computation, data storage, and data retrieval. A client device such as a smart phone, Internet-of-Things (IoT) compatible device, a smart home, building appliance (e.g., refrigerator, light, camera, or lock), wearable device (e.g., health monitor, smart watch, or smart glasses), connected vehicle (e.g., self-driving car or flying vehicle), and smart city sensor (e.g., traffic sensor, parking sensor, or energy use sensor). Client devices access resources of a data center using a high-speed wireless networking connection. For a client device that is mobile, data centers of varying capabilities can be available to perform service requests from the client.

BRIEF DESCRIPTION OF THE DRAWINGS

FIG. 4B depicts an example of a user request manager.

FIG. 4C depicts an example interaction between a service discovery agent and a service list.

FIG. 4D depicts an example service list format.

DETAILED DESCRIPTION

Figure 1:
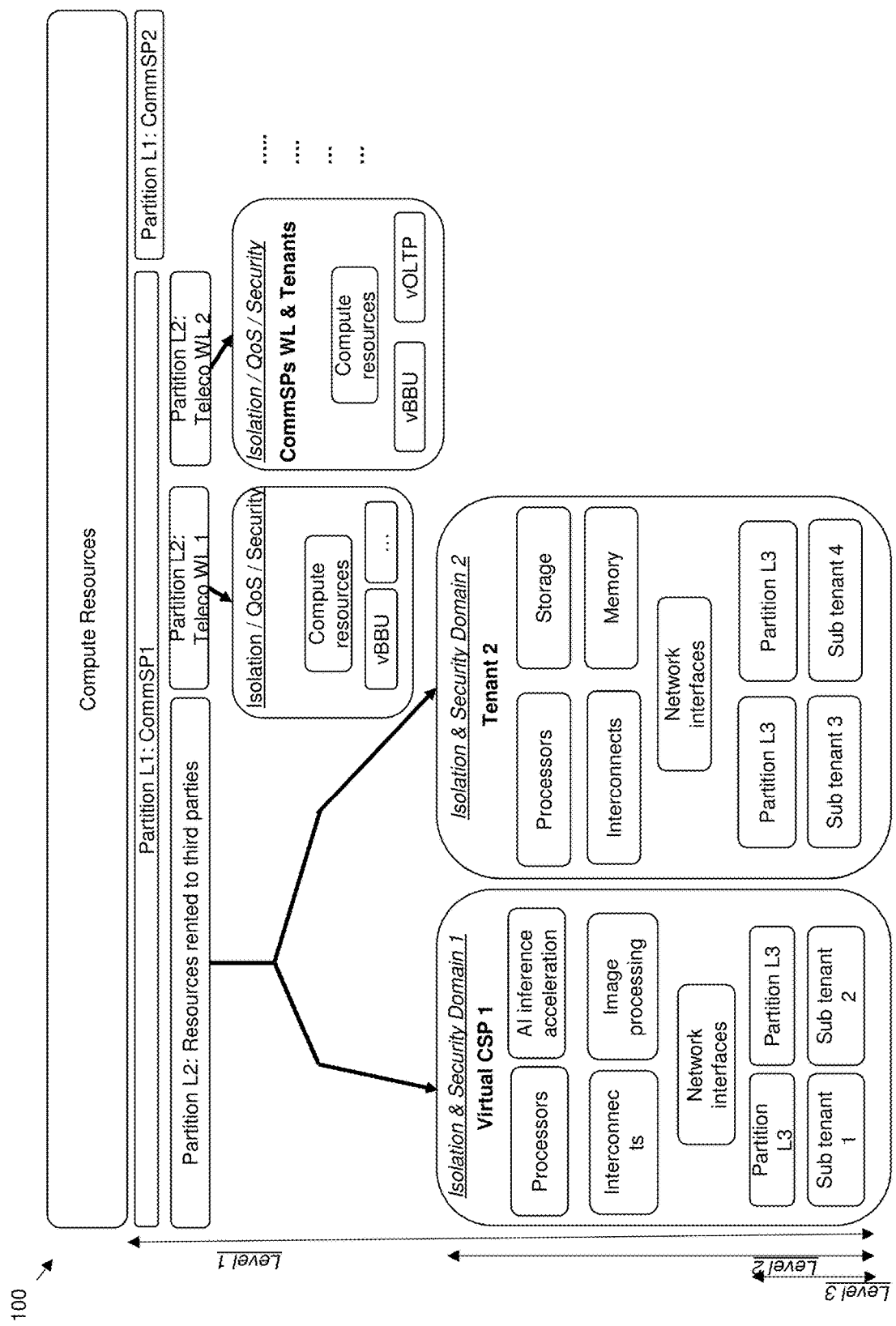
FIG. 1 illustrates a hierarchy of organization of edge resources into clusters.

The edge computing cluster and data center clusters encompass an ever growing diversity of client usages such as smart cities, augment reality (AR)/virtual reality (VR), assisted/autonomous vehicles, retail, proximity triggered services, and other applications with a wide variety of workload behaviors and requirements. However, using a data center that is physically located miles from the client device can introduce latency in completing a work request. In addition, for a client device that is moving, such as in a car or other high speed vehicle, the client device can move into a compute cluster region and then out of the region rapidly. Devices that are in-motion pose a challenge of the need for even more rapid deployment of work by the cluster to provide data to the client device in a timely manner.

For example, time-sensitive responses can include: providing relevant advertising or content before a user looks away, identifying a store that the user has been trying to find while driving, assist a self-driving car avoid other cars through a busy intersection. Certain work requests for clients are urgent or important and some are urgent and important. An urgent request can be for example, determining and providing an advertisement in few hundred milliseconds, for example. Directions for a self-driving vehicle are urgent and important and it would be preferable to perform computations and communications to the client on the order of microseconds, for example.

Typically, a communication service provider (CommSP) provides requirements that are statically defined and a resource selection process is embodied in orchestration layers and load balancers. The client would need to constantly query the CommSP to find out about updates to the services offered and to update requirements for forthcoming workload requests. Querying and handshaking introduce latency, use networking resources, and expend power.

In one known approach, a client device provides a workload request with performance requirements to an orchestration layer. The orchestration layer communicates with a variety of computing resources and platforms and maps the workload with its requirements to a selected platform that can meet the service requirements. Thereafter, the selected platform can perform the workload according to the service requirements. However, the use of an orchestration layer incurs latency due to communication between the client and the orchestrator and the orchestrator with the selected platform and so forth. In addition, the orchestrator receives workload requests and requirements using a specific protocol or application program interface (API). For client devices that are unfamiliar with the orchestrator or do not support the protocol or API, the client device is unable to request performance of a workload. Further, an orchestrator can be executed at a physically distant computing platform from the selected platform to perform a request, thereby introducing additional delay in completing a request.

A client device and an edge data center can perform a handshake when selecting a platform or the edge gateway send a request to an orchestrator for matching and load-balancing. However, the handshake or use of an orchestrator can impede time-critical FaaS or workload requests from meeting tight deadlines or do so predictably and may further require proactive reservations over resources. Proactive reservations can lead to fragmentation of resources, and thus drive up costs and inefficiencies.

Some workloads rely on machine learning (ML) or deep learning (DL) inferences that are specialized for specific groups of requestors whereas some workloads use hardware accelerated execution to complete in the narrow time budgets. Some workloads can be performed as Function as a Service (FaaS) actions. Many workloads require proximity to specific data consumed in their operation, both due to speed and data movement challenges, while others may arise with special needs. For example, a wearable device may use an AR service from only a particular set of service providers that use a certain algorithm for high accuracy. As another example, an assisted driver may request a particular navigation service from a specific service provider whose maps are updated in less than X hours.

In a known approach, the client device interfaces with a software stack and uses the software stack to submit Accelerated Function as a Service (AFaaS) or FaaS requests and the client device provides a FaaS ID with the request to be executed. FaaS scheduling occurs under CommSP policies that do not change dynamically for every request. By contrast, edge clients are expected to request a wide variation in implementations (e.g., simple, complex, or hardware accelerated). The same client may operate under different throughput, latency, or bandwidth constraints at different times or for different work requests.

Various embodiments provide a manner of allowing a client device to request and use computing resources at a computing cluster without knowledge of the available resources or use of a prescribed application program interface (API). Various embodiments provide a set of layered resource brokering mechanisms between edge devices (e.g., clients) and the edge data center or data center resources in order to select the right resources or provider to meet workload requirements from the edge devices. Edge data center resources can be distributed across base stations, central offices, customer premise equipment, and so on.

Various embodiments provide low latency brokering mechanism(s) in which the client requirements are factored into selecting the right FaaS or AFaaS execution vehicles and surrounding context for security or other specializations. Various embodiments permit functions to not have their own durable, multi-invocation history.

Various embodiments provide a client with the capability to issue a request for a workload with an executable code segment and performance requirements. A resource manager can receive the request and validate the request to ensure it is properly executable by the resource manager or its affiliate. The resource manager can be integrated with a networking hub such as a base station, central office, cell towers, or an edge gateway. The networking hub can also include or be directly coupled, through a high-speed interconnect (e.g., PCIe, optical interconnect, and so forth), with a computing platform that offers resources such as an edge node or data center that provides central processing units, storage, memory, programmable control logic, field programmable gate arrays, software applications, or other fixed function devices. The resource manager can provide a query-able list of available resources. The code segment can perform service discovery of the computing resources to determine available compute resources that could be used to perform the workload in a manner that at least meets the performance requirements. For example, the executed code segment can provide its workload and requirements as a text format or file to the resource manager and the resource manager can provide identifiers of computational resources to perform the workload. In another example, the executed code segment can query the list of resources and determine which resources can perform the workload. Accordingly, the client can request performance of a workload without a predefined protocol or API.

For example, a computing platform can provide various computing resources that can perform a workload request according to the workload specifications. The executed code segment can select computing resources from among the available resources.

Various embodiments provide an accelerated resource selection (ARS) unit that can receive a FaaS or other workload requests from client devices and select the resources that will meet requirements of the workload request. Client devices send workload requirements for a service using a service discovery agent to a wireless or wired network interface (e.g., edge gateway). When a workload request reaches the wireless or wired network interface, the ARS unit validates the service discovery agent. The ARS unit executes a validated service discovery agent and the service discovery agent selects the computing resources or service to perform its request in accordance with workload specifications/requirements. A wireless or wired network interface can include platform resources, together with the ARS unit.

FaaS services or computing resources can be offered by many vendors in the edge cloud and may be regularly updated or changed with evolving new or deprecated features. Updates may add or compromise features that are relevant to a given client's particular FaaS or workload request. Execution of the service discovery agent provides for each FaaS request or workload request is mapped to the right implementation according to features and providers without the client knowing what capabilities are available. Further, the scheme allows more dynamic updates to FaaS services or computing resources by vendors, by updating the registered information, rather than changing software in orchestrators, clients, and introducing cumbersome handshakes.

Various embodiments permit monitoring of resource utilization, queue depths, fabric latency build-up points, and so forth as telemetry inputs available to the ARS unit and the service discovery agent to provide for adaptive load balancing and service level agreement (SLA) compliance mechanisms.

FIG. 1 illustrates a hierarchy of organization of edge resources into clusters. Clusters can be protected or domain isolated by functions, clients, and so forth. Some edge actions may need ultra-low response time (e.g., AR/VR) and therefore better isolation from other uses. Other uses (e.g., surveillance systems) may require high trust and high security, while yet other uses may need protection from data loss (e.g., data integrity and backup). Frequently, actions with diverse performance isolation and security needs may emanate from the same client and are directed to different resource pools. The conditions for selecting a service provider for a particular FaaS request may also be dynamic and can be based on several factors such as background of the request, availability, algorithms used by the service providers, and so forth. Therefore, the edge cloud infrastructure is to be capable to satisfy a myriad of isolation needs when directing FaaS requests to computational capabilities organized in different pools, partitions, containers, hosts, virtual machines (VMs), pods, and so forth.

A variety of levels of resource sharing or allocation are provided with multiple levels of security, multiple domain and performance isolation requirements, and multiple use cases. Level 1 includes sharing an edge compute tier between multiple communication service providers (CommSPs). For example, the edge compute resources can be provided in a base station, central office, or data center or accessible to the base station, central office, or data center. For example, compute resources offered to CommSPs, cloud service providers (CSPs), or tenants can include processors, artificial intelligence (AI) inference acceleration, interconnects (e.g., PCIe, optical interfaces, or High-Speed Serial Interface (HSSI)), image processing acceleration, and network interfaces (e.g., Ethernet or Infiniband compliant). The compute resources can be provided on a physical rack or use software virtualization.

For example, level 1 edge compute resources can be shared at level 2 between communication service providers 1 and 2 (respective, CommSP1 and CommSP2). CommSP1 can partition resources into domains and for use itself or rent out resources for use by others (e.g., Verizon, Sprint, and so forth). Level 2 provides for sharing edge communication service provider partitions between multiple customers, wireless (WL) base stations, and cloud service providers (CSPs). Level 3 provides for sharing a CommSP among multiple tenants.

For example, a partition level 1 of compute resources allocated to a CommSP1 can be shared with several entities: a virtual CSP1 and a tenant 2, a telecommunication wireless provider (Teleco WL 1), and another telecommunication wireless provider (Teleco WL 2). A partition level 2 can include allocation to a Virtual CSP1 and a tenant 2. A partition level 3 can include allocation by Virtual CSP1 to subtenants 1 and 2. In a similar manner, partition level 3 can include tenant 2 can allocating its resources to subtenants 3 and 4. Teleco WL 1 can provide computing resources to a variety of entities such as a virtual baseband unit (vBBU). Similarly, Teleco WL 2 can provide compute resources to a variety of entities such as a vBBU or a virtual online transaction processing entity (vOLTP).

Figure 2:
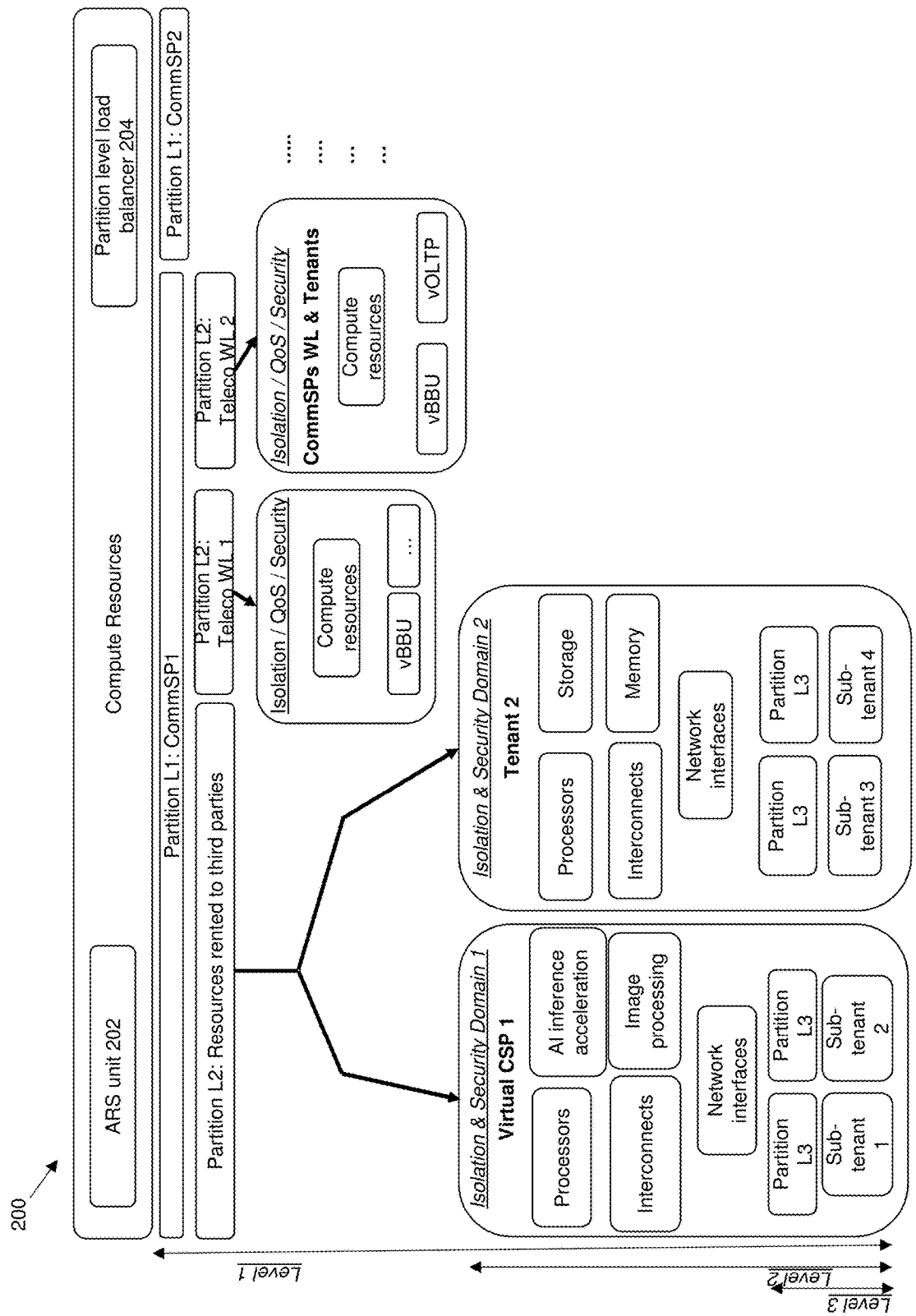
FIG. 2 shows an embodiment that can be used to provide for capabilities discovery and selection and load balancing.

FIG. 2 shows an embodiment that can be used to provide for capabilities discovery and selection and load balancing. In a similar manner as system 100, system 200 provides compute resources that can be shared among communication service providers (CommSPs), telecommunications wireless providers, tenants, and subtenants. In this example, a client (not shown) can provide a workload request (e.g., FaaS request) and invoke ARS unit 202. ARS unit 202 can be located at a network interface and guide the operation of execution of a workload request, in order to accelerate the decisions about which service provider, which implementation, which set of domains/partitions may be considered by a hierarchical resource assignment scheme responsive to the workload request. Any of the entities at partition levels 1-3 can offer compute resources that can satisfy the client request. In an embodiment, ARS unit 202 can include a list of resources available for use by the client. For example, in some cases, resources available to a client may be different depending on the make, model, wireless carrier, or other subscription associated with the client. A resource discovery agent provided by the client with the workload request can discover which resources are offered at the various partition levels. The resource discovery agent can select the resource to request execution of a workload.

Partition level load balancers 204 can provide for load balancing of compute resources offered at each level—levels 1 to 3. For example, if a resource discovery agent selects a compute resource offered by virtual CSP 1 and specifically sub-tenant 2, partition level load balancer 204 can perform load balancing at levels 2 and 3 with respect to all requests to use those compute resources. Load balancing can provide for the requested resources being balanced in terms of resource usage to reduce workload completion time. In some cases, partition level load balancer 204 can use a round-robin selection scheme to select which workload request is to be performed next. In some cases, partition level load balancer 204 can select dispatch performance of workload requests with lower latency requirements or with preferred execution status. Partition level load balancer 204 (e.g., level 1, 2, or 3) can consider various factors to determine which resource to select. For example, what resource is available on the partition (e.g., accelerated or non-accelerated resources) can be considered as well as load on each of the resources and occupations (e.g., current resource load, estimated time to availability, remaining resource space, available memory, boundedness, utilization, and so forth).

Figure 3:
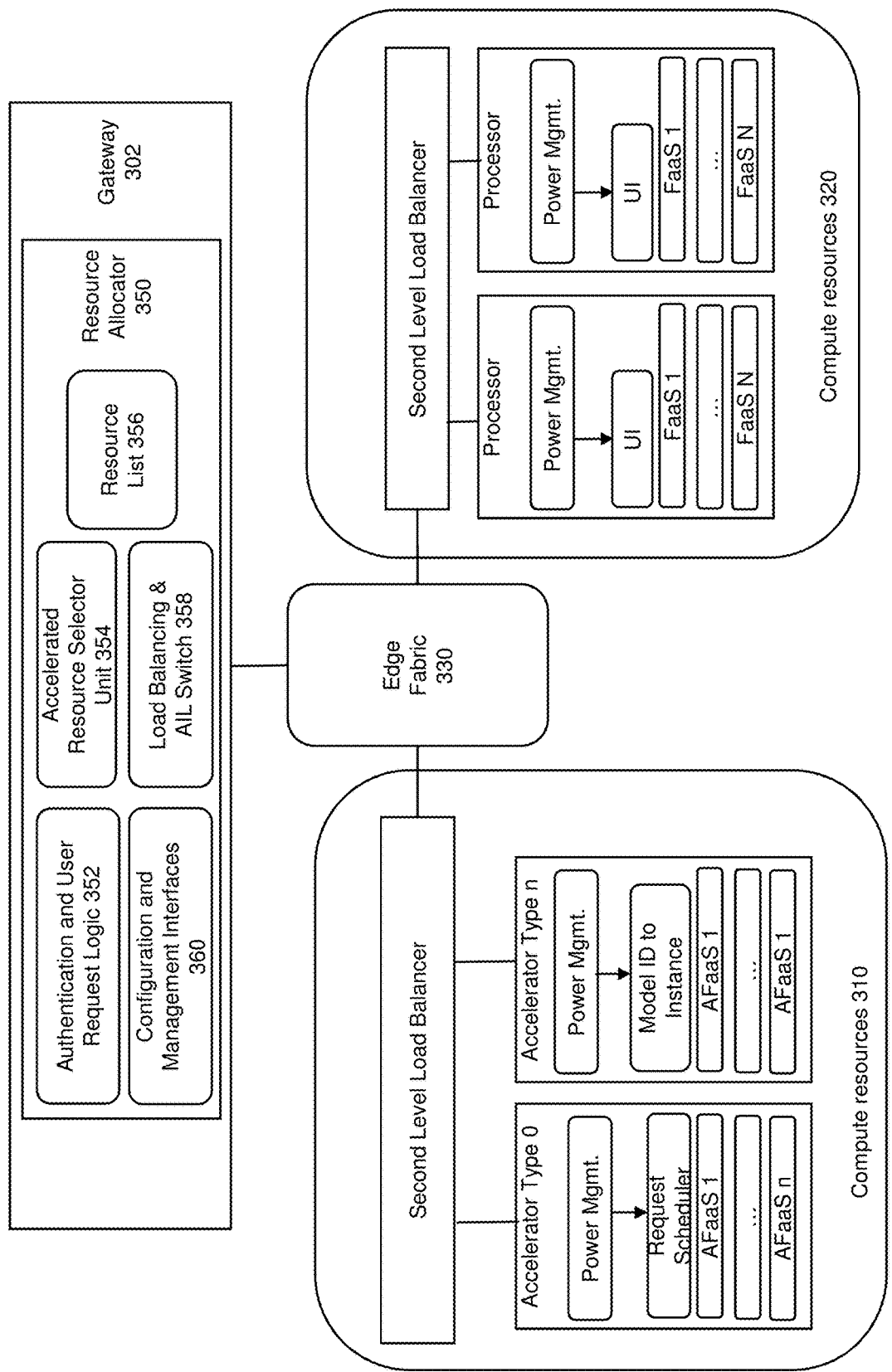
FIG. 3 shows an illustration of an edge gateway and data center.

FIG. 3 shows an illustration of an edge gateway and data center. Gateway 302 can include or be communicatively coupled to resource allocator 350. Gateway 302 provides a client interface and switch features. Resource allocator 350 can provide for processing of workload requests from clients whereby some of the requests include a service discovery agent to investigate and select resources for use to execute a workload. The resources can be provided via compute resources 310 and 320. In this example, compute resources 310 and 320 can be provided in racks or drawers of connected compute resources. Each rack or drawer includes different types of resources that may be deployed for serving workload (e.g., FaaS) requests. Other numbers of racks or drawers of compute resources can be provided. Gateway 302 can be coupled to compute resources 310 and 320 via edge fabric 330. Edge fabric 330 can be compatible with Infini-Band, PCIe, optical, and so forth.

Authentication and User Request Logic 352 can receive incoming client requests and store received requests. A queue can be used to store all client requests and track progress. The user request logic parses the client request to authenticate the request. A request can be authenticated based on one or more of: client device identifier, user identifier, identifier of an application that issued the request, header information in a packet that provided the request, an accepted packet format, an accepted token provided with the request, successful decryption of the request, or successful access to the request using a key value. If the request is authenticated, the service discovery agent provided with the request is provided to Accelerated Resource Selector (ARS) unit 354. The service discovery agent can be an executable code segment that was originally written in any code language including but not limited to VHDL or OpenCL. The executable code segment, after authenticated, can be permitted to execute on ARS unit 354 but limited to query operations to a region of memory dedicated to storing available compute resources. Limiting operations of service discovery agent and limiting accessible memory can provide for security in the case of malicious uses of service discovery agent.

ARS unit 354 includes a processor or other hardware (e.g., programmable control logic, FPGA, x86 core, ARM compatible core) that can execute the service discovery agent. Note that there can be multiple number of such processors or hardware to execute service discovery agents in parallel. Execution of the service discovery agent can identify the list of vendors or compute resources providing the requested service and the features or algorithms employed by each of them. Execution of service discovery agent causes querying of resource list 356 for available resources that meet SLA or other performance requirements of the request. Resource list 356 can maintain a list of all available resources in compute resources 310 and 320. Changes in the available resources (e.g., resource additions or deprecations) are communicated by compute resources 310 or 320 (or by a separate resource manager) to resource list 356 to update available resources.

Note that some requests may not have access to all available resources on compute resources 310 and 320 but instead a subset of resources. For example, some clients may have subscriptions or devices that are permitted to use a resource whereas other clients do not have permissions to use the resource. Resource list 356 can filter services that are not permitted for use by a client and not provide those as options for selection.

If a client request does not invoke use of resource allocator 350, the request can be handled using an orchestrator to select appropriate resources for the work request and provides the request to the selected compute resource for execution.

After service discovery agent selects a resource, the ARS unit 354 communicates the selected resource to authentication and user request logic 352 for management of the request execution. Authentication and user request logic 352 can maintain a log of requests with resource selection and results. Authentication and user request logic 352 can provide the request with the resource selection to load balancing and accelerated interface link (AIL) switch 358 for execution scheduling. Load balancing and AIL switch 358 retrieves requests from authentication and user request logic 352 to distribute request to selected compute resources. Load balancing and AIL switch 358 retrieves requests whose service discovery agent has already been executed and a matching service provider has been selected. Load balancing and AIL switch 358 can schedule execution of the request on the selected resource by balancing demands associated with execution of other requests to use the same or overlapping resources. For example, to choose a specific computing resource on which to deploy a workload, load balancing and AIL switch 358 can use a variety of selection criteria such as but not limited to: round robin, least utilized, a pseudo-random selection. For example, if a latency requirement of a request A is 40 milliseconds and a request B to use the same resource is 20 milliseconds, request B can be chosen for execution before execution of request A.

Compute resources 310 and 320 can use their own load balancer (shown as second level load balancer) to balance work requests from load balancing and AIL switch 358. Second level load balancer of compute resource 310 can determine which compute request to provide to one of accelerators type 0 to n. Second level load balancer of compute resource 310 can decide which request to forward to an accelerator based on one or more of: a current resource load, estimated time to availability, remaining resource space, available memory, boundedness, utilization, and so forth. An accelerator can use power management logic, a request scheduler, and one or more hardware-implemented processors, programmable control logic, FPGAs, ASICs, or other logic to perform the request.

For example, an accelerator can use a neural network, processors, and memory. Processors can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). A neural network can be embodied as a separate neural network device use any components of processors. Multiple neural networks, processor cores, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Second level load balancer of compute resources 320 can decide which request to forward to a selected processor based on similar criteria as applied by second level load balancer of compute resource 310. Compute resources 320 can provide similar or different compute and accelerator resources as those of compute resources 310.

A result provided in response to a workload request can be provided through edge fabric 330 to authentication and user request logic 352. Authentication and user request logic 352 can provide the result to the requesting client via a wired or wireless network interface (not depicted). Authentication and user request logic 352 can store selected resources for a workload request. In a subsequent workload request, the selected resources can be offered to the same or different client if the same workload is requested thereby bypassing use of ARS unit 354 and resource list 356.

Configuration and management interfaces 360 is used to update resource list 356 with the currently set up services and their security and authentication methods. A vendor can use this interface to also update their service to a new version and as well record the update in the gateway's resource list 356 based on changes to compute resources 310 or 320 (including deprecation) or the addition of other resources.

Figure 4A:
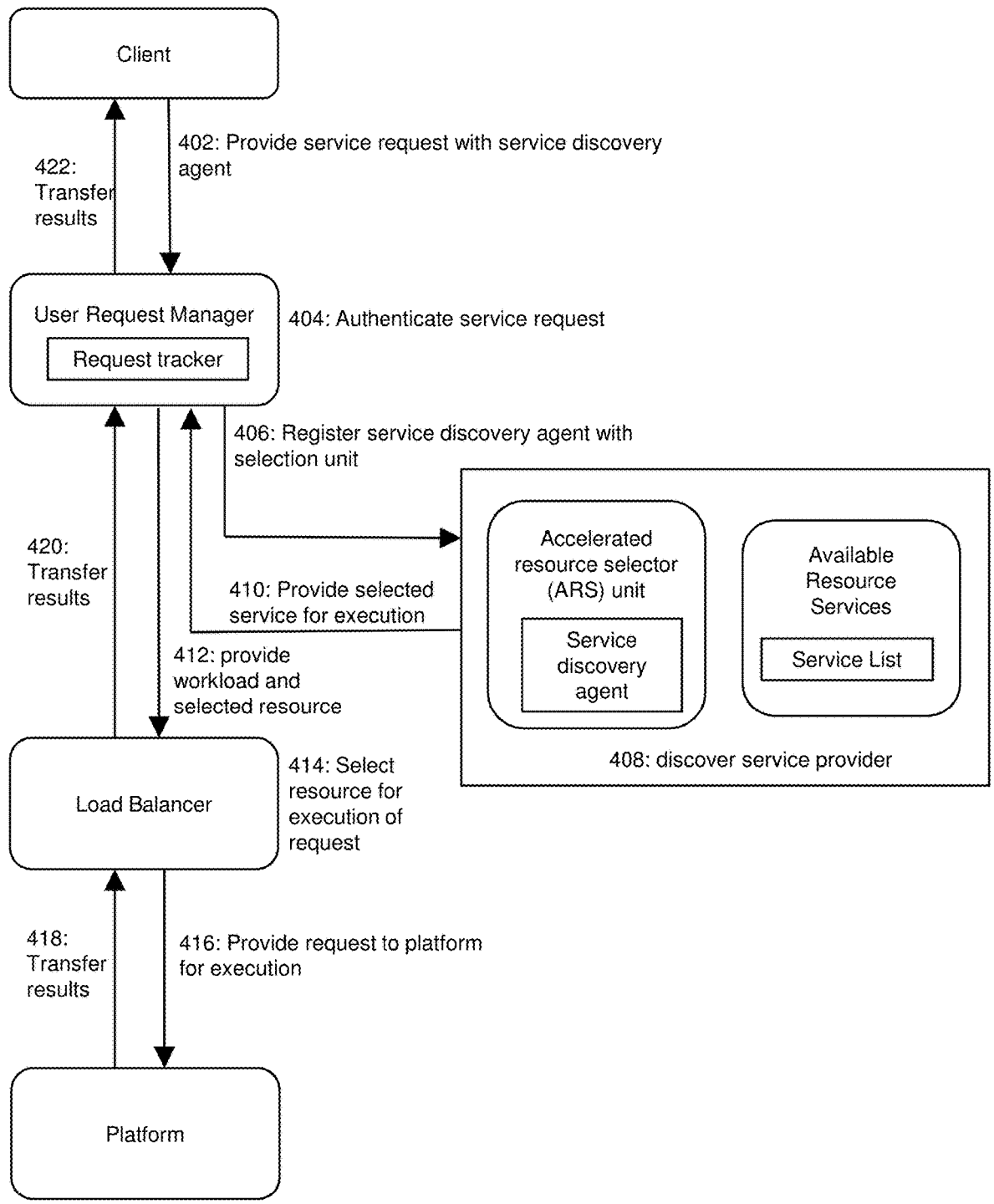
FIG. 4A illustrates operations in connection with a client submission of a request to a computing cluster.

FIG. 4A illustrates operations in connection with a client submission of a request to a computing cluster. At 402, a client can send a service and/or workload request to a gateway. The request can include one or more of: an identifier of a user, an identifier of the client, an identifier of an application that requests a service, an identifier of a task to perform, a reference to data to process in the task, performance requirements of the task, and include a service discovery agent. The gateway can provide communication capabilities and access to compute resource capabilities. The client may not know the capabilities of any gateway when it issues a request with a service discovery agent. At 404, a user request manager can authenticate the service request and/or its service discovery agent. Authentication can involve one or more of: determining if a client that originated the service request is permitted to access compute resources, determining if the application that originated the service request is permitted to access compute resources, determining if the service request is decryptable using a key used by user request manager, performing a hash to determine if an expected value is generated, or other criteria. If the service request is authenticated, at 406, user request manager registers the service discovery agent with the accelerated resource selector (ARS) unit. The user request manager includes a request tracker in which workload requests in service requests are stored before being sent for execution by the load-balancer.

In addition, a registered service discovery agent can be identified by a handle/identifier. The handle can be used in the request tracker for logging progress of the service discovery agent and for tracking billing and usage.

At 408, the ARS unit can execute the service discovery agent on a processor or other instruction executing hardware (e.g., processor, programmable control logic, or an FPGA) to determine a service provider. The service discovery agent can be an executable kernel code segment originally written in OpenCL, VHDL, or any programming language. Execution of the service discovery agent can cause an access of available resource services and discovery of services that meet or exceed performance requirements specified by the service request.

The executed service discovery agent can use the various information about the resources and make the information available by an interface to the service discovery agent. This information includes, but is not limited to, one or more of: a list of service providers, their hardware and software specifications sufficient for making routing/load-balancing decisions (e.g., compute nodes used, software stack used, and so forth), the corresponding SLA interfaces and their utilization, average service times, queue depths, and other telemetry as is meaningful for a resource type.

For example, execution of the service discovery agent performs a function call to the available resource services module to query a service list or write service requirements (or both). For example, service discovery agent can employ Portable Operating System Interface (POSIX) APIs to query a service list file or write to a file accessible to the available resource services module. The file can be a service list and properties. In another example, the service list is a database or a table and the service discovery agent can use a database query interface to query the service list. In another example, if the service list is a program or application, service discovery agent can use a remote procedure call (RPC) to query the service list.

For a writing of service requirements by service discovery agent, service discovery agent can use a JSON interface to send text or send a text file to the available resource services module using syntax markers that indicate properties of the characteristics that are requested. For example, a syntax marker of <latency> can be used to indicate a desired latency value follows the marker, a marker of <monetary cost> can be used to indicate a monetary cost cap to use a service follows the marker, and so forth. The available resource services module can interpret the text or text file and retrieve a list of resources that meet the requirements. If several service providers meet the performance requirements, service discovery agent or ARS unit can perform a round robin pick, pick a favorite provider, pick a less costly service, or follow criteria specified in the service discovery agent for choosing between multiple services that meet performance requirements.

If the service request does not provide a service discovery agent but specifies a requested service and performance requirements, the user request manager or accelerated resource selector unit can assign default resources. For example, resources can be assigned that were allocated in a previous execution of a service discovery agent for the same workload request with the same or higher performance requirements. In an example, default resources that are expected to meet the performance requirements can be assigned. In some examples, a default service discovery agent could be executed by the ARS unit to determine resources associated with service requests that do not provide a service discovery agent.

Given the small latency requirements of the service requests, the service discovery agent is to determine a resource in a small amount of time prescribed for example by a service level agreement (SLA). In a case where a service discovery agent is not able to determine a resource with the time prescribed by the SLA, the service discovery agent can end and a fallback selection can be provided. For example, a default resource selection or a popular selection can be provided. In some cases, as a fallback, another instance of the ARS unit can be used to execute the service discovery agent to determine a resource.

In some embodiments, the client provides a handle, pointer, or identifier to a service discovery agent with a service request instead of including the service discovery agent but includes performance requirements. The identified service discovery agent can be stored in memory and executed by the accelerated resource selector unit to discover a service. Other manners of creating, storing, referencing, and invoking a service discovery agent can be used.

At 410, the ARS unit writes an identifier of the computing resources determined by the service discovery agent to the request tracker queue of the user request manager in which user requests are stored. User request manager can track the progress of each service request in a table. At 412, the load balancer can load or receive one or more service requests with corresponding resource identifiers. At 414, the load balancer distributes the request according to load balancing techniques. For example, to choose a specific computing resource on which to deploy a workload the load balancer can use a variety of selection criteria such as but not limited to: round robin, least utilized resource, or a pseudo-random selection. If two workloads request use of the same service, a first-in-first-out scheme can be used to select the request that will use the service.

At 416, the load balancer provides the workload request to resources in a computing platform to the selected computing resource. In a case where a computing resource identifier is provided, the load balancer can choose among available resources with the same or better performance criteria and cost criteria so that the specific identifier compute resource does not need to be used or selected and the load balancer can balance use of resources. The computing platform can include a variety of hardware and software component include: central processing units, AI inference acceleration, image processing, programmable control logic, FPGAs, graphics processing units (GPUs), general purpose GPUs, fixed function operations, accelerated look-up, and so forth. The computing platform can be within the same package, device, rack, room, or building as the user request manager, ARS unit, and load balancer or connected to the user request manager, ARS unit, and load balancer via a high speed interconnect or network connection.

After the workload execution is complete, at 418-422, workload results are returned to the client via load balancer, the user request manager, and a transmitter (not depicted). In some examples, results can be transferred directly to the client using a transmitter without transferring the results to through the load balancer and the user manager and the results can also be stored in the request tracker of the user request manager. Results can include data, text, images, video, content, software, executables, hyperlinks, and so forth.

The user request manager, ARS unit, load balancer, and platform can be provided in a same physical housing that houses a wireless or wired base station or central office or connected with the base station or central using a high speed interconnect or network.

In one example, an augment reality (AR) client device requests computing resources from an AR provider and provides its service discovery agent. The workload parameters can be: AI inferences (object detection), augment frames with inferred references, and generate image frame back to user with annotations. The service discovery agent can query for available services of meeting specified criteria for available hardware (e.g., FPGA), AI models available, latency per image frame, or monetary cost per latency level. A selected service on a computing platform can complete the request and the results are returned to the client.

FIG. 4B depicts an example of a user request manager. User request manager 432 can include a processor, memory, hardware that executes instructions, and interfaces to other devices. In this example, user request manager 432 can use a service request authentication logic 434 to authenticate a service request received from a client. Authentication of a service request can include determining if the service request includes accepted content or access rights by determining if one or more of the following is acceptable: packet characteristics, header content inspection, cyclic redundancy check (CRC), decryption using a key, client IP address, or identifier of application that issued the service request.

Tracker 436 can be stored as a table in a memory. Tracker 436 can include a service request identifier (ID), a workload request, selected resources that are provided by an ARS unit from execution of the service discovery agent associated with the service request, a result from use of the selected resource or its alternative, and a handle associated with a service discovery agent provided with the service request. For example, a service request identifier can be determined from content of the service request or a hash of a portion of the service request. The workload request can be provided with the service request and specify a task. For example, a workload request formats can include one or more of: ARS bitstream, SLA requirements, task to perform, security requirements (e.g., data encryption), reliability (e.g., X % of service assurance), or workload definition (e.g., workload to perform). The handle can refer to a service discovery agent identifier that is provided with the service request or determined and assigned by user request manager 432. The handle can be used to identify a service discovery agent or a service discovery agent provided with a specific workload request and specific performance requirements. Tracker 436 can track other features.

FIG. 4C depicts an example interaction between a service discovery agent and a service list. In this example, execution of service discovery agent 440 provides for a workload type and requirements 442 to be provided using interface 444 to service list 450. The workload type can specify the type of work to be performed using an identifier value. For example, a request for an AI inference using images provided with the service request or accessible using a pointer in the service request can be assigned an identifier value of 0001. A request for a database query using data provided with the service request or accessible using a pointer in the service request can be assigned an identifier value of 0010. Other types of workload identifiers can be provided. Requirements associated with the workload type can be specified for example as: latency to perform the request, power use, monetary cost, and other factors.

Service discovery agent 440 uses interface 444 to provide the workload type and requirements 442 to service list 450 using a query or a write. Interface 444 can be a JSON interface, POSIX API, remote procedure call (RPC), or other interfaces. Service list 450 provides a resource identifier or identifiers that can perform the workload and satisfy its requirements as a result. The result can be written to a service request tracker (e.g., tracker 436 of FIG. 4B).

FIG. 4D depicts an example service list format. The service list can include a variety of fields including but not limited to: workload type identifier, latency, cost, algorithm used, and so forth. Workload type identifier can identify a type of workload that can be executed. For example, a workload type identifier can identify use of an AI inference engine, a database search, storage, database query, and so forth. Field latency can specify an amount of time to perform a type of workload. Field cost can specify a monetary cost and/or a power consumption cost. Field service application can specify a type or specific name of algorithm to be used. If a workload requirement specifies a type of algorithm to use, this field can be used to select acceptable resources. Field resource identifier can specify the resource identifier for the parameters, such that this identifier can be a candidate resource identifier for selection by the service discovery agent and, if selected, provided to a user request manager. Note that for a workload type identifier, there can be multiple rows or resources that can perform the workload and the service discovery agent can select the resource based on workload requirements and preferences.

Figure 5:
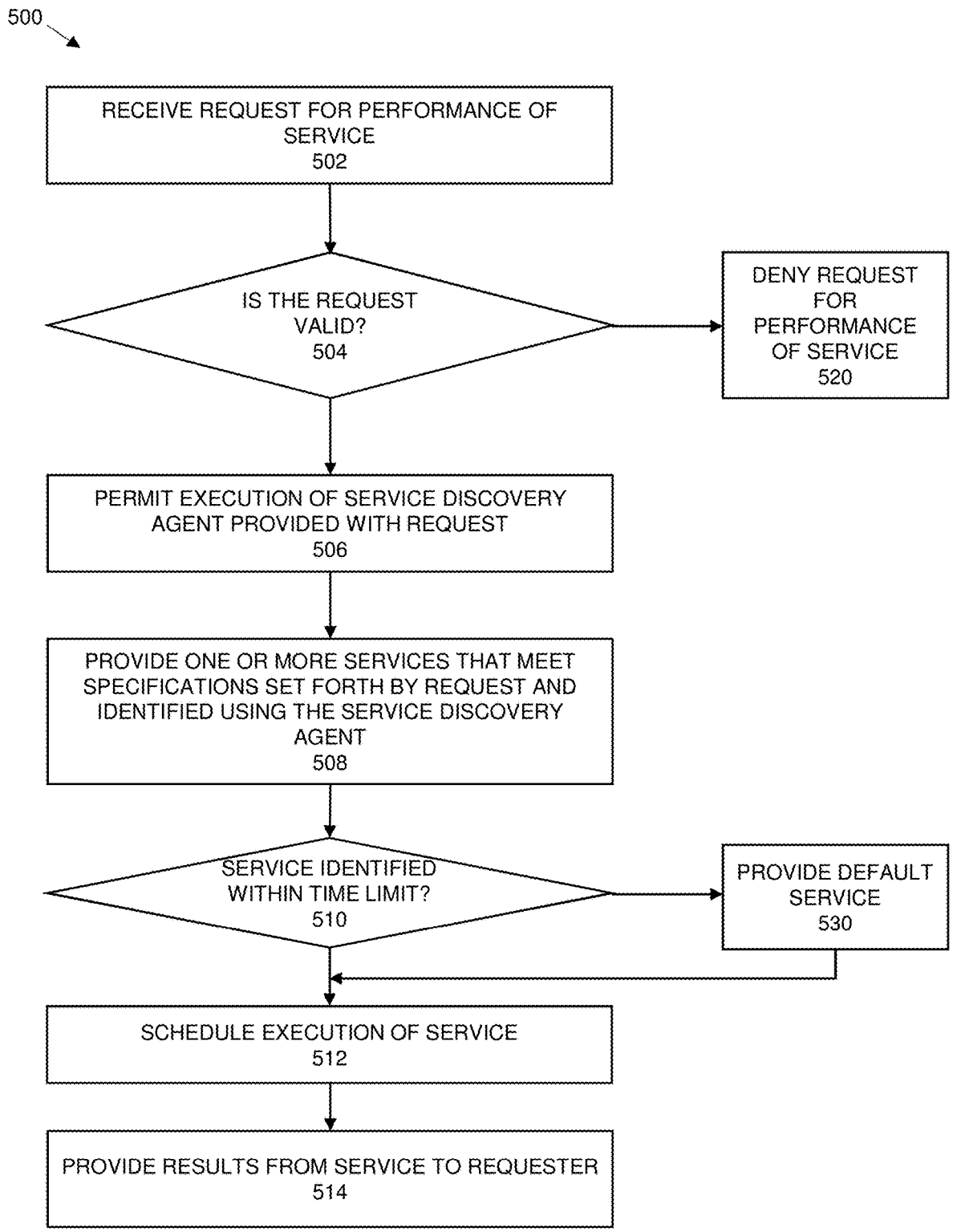
FIG. 5 depicts an example of a process.

FIG. 5 depicts an example of a process. At 502, a request to perform a service is received. The request can be provided by a client device executing an application. The request can be received at an edge gateway or other wired or wireless network interface such as a base station or central office. The request can include a user identifier, a client device identifier, an identifier of an application that requests a workload or service, an identifier or specification of a task to perform, a reference to data to process by the task, performance requirements of the task, and include a service discovery agent. At 504, a determination is made as to whether the request is valid. Authentication of the request can be made using a variety of factors such as client IP address, key-based validation, CRC check, hashing, requesting application identifier. If the request is valid, action 506 follows. But if the request is not valid by failing any prescribed validation action, action 520 follows where the request is denied.

At 506, a service discovery agent associated with the service request is executed. The service discovery agent can be a compiled binary executable on a hardware device such as a processor, programmable control logic, or FPGA. At 508, the service discovery agent interrogates a service list of available services for workload types to determine which service can meet the requirements of the service request. At 510, a determination is made if the service is identified within a prescribed time limit. If a service is identified within a time limit for service identification, then action 512 follows. If a service is not identified within the time limit, action 530 follows where a default service is provided and action 512 follows.

At 512, the selected service is scheduled for execution. For example, the selected service can be stored in a service tracker and a load balancer can retrieve the selected service and schedule execution of the workload using the service or an equivalent service that could meet requirements of the workload. At 514, results from performance of the workload are provided to the client. Results can be provided to the client via a network communication.

Figure 6:
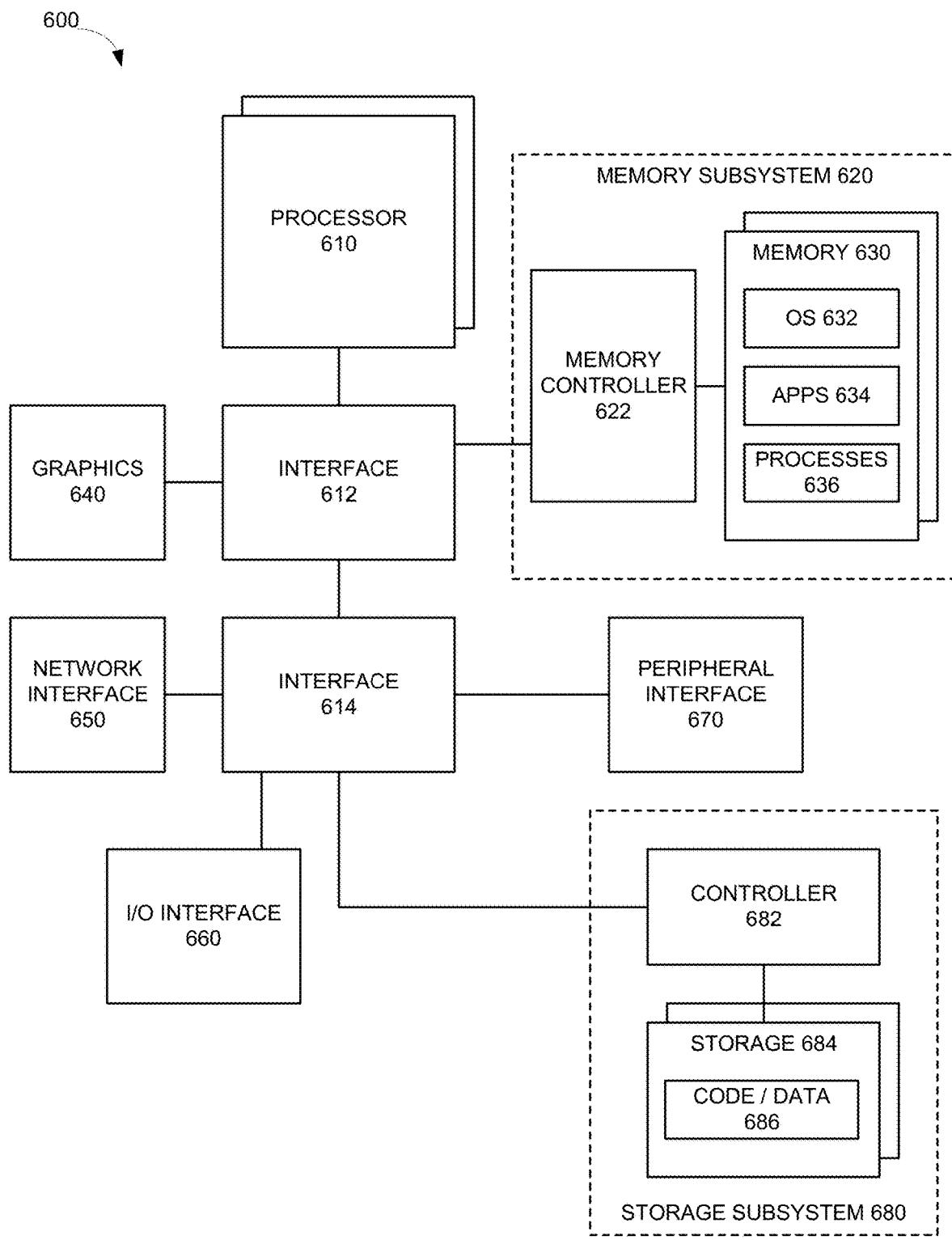
FIG. 6 depicts an example system.

FIG. 6 depicts an example system. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1364 bus.

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
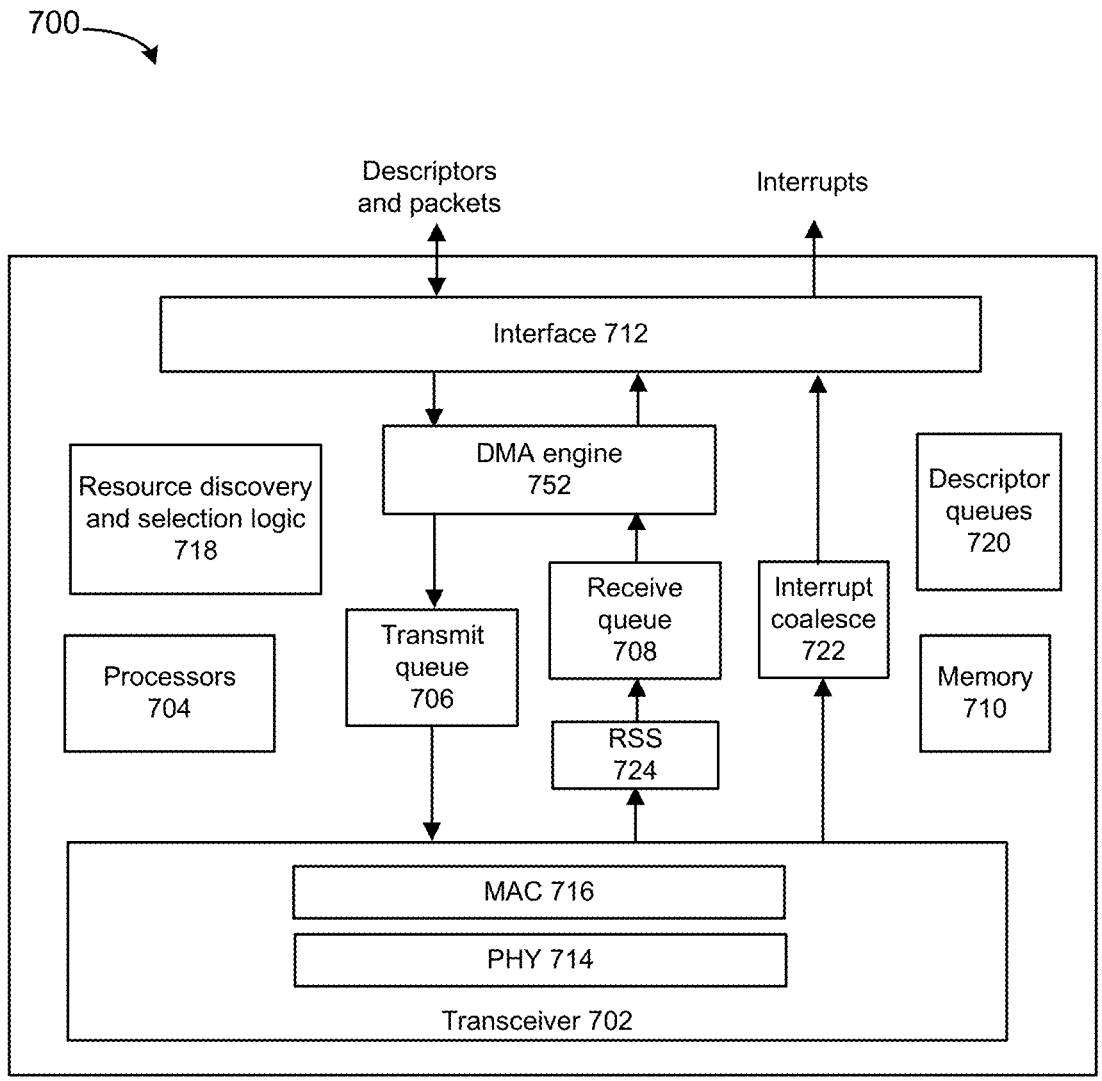
FIG. 7 depicts an example network interface.

FIG. 7 depicts an example network interface that can use embodiments. Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets. MAC circuitry 716 can be configured to assemble data to be transmitted into packets, that include destination and source addresses along with network control information and error detection hash values. Processors 704 can be any processor, core, graphics processing unit (GPU), or other programmable hardware device that allow programming of network interface 700. For example, processors 704 can provide for identification of a resource to use to perform a workload and generation of a bitstream for execution on the selected resource.

Resource discovery and selection logic 718 can process a workload request from a client and execute a service or resource discovery agent to discover available compute resources available directly or indirectly from network interface 700. For example, network interface 700 can be communicatively coupled with compute resources and resource discovery and selection logic 718 can allow service or resource discovery agent to discover at least some of the compute resources. Resource discovery and selection logic 718 can perform various embodiments described herein.

Receive side scaling (RSS) 724 can provide distribution of received packets for processing by multiple CPUs or cores. RSS 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s).

Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items.

The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

What is claimed is:

1. A network communications apparatus comprising:
a receiver to receive a request to perform a workload, the request including a handle to identify and select an executable code segment and
a circuitry communicatively coupled to the receiver, the circuitry to selectively permit the identified executable code segment to execute on a processor to discover available resources and to select a resource that satisfies performance requirements of the workload, wherein
to discover available resources, the executable code segment is to process data to indicate available resources and corresponding performance capabilities and
to select a resource that satisfies performance requirements of the workload, the executable code segment is to select a resource based on performance requirements of the workload.

2. The apparatus of claim 1, wherein the circuitry is to permit the executable code segment to discover available resources based on one or more of: client device identifier, user identifier, identifier of an application that issued the request, header information in a packet that provided the request, an accepted token provided with the request, successful decryption of the request, or successful access to the request based on a key value.

3. The apparatus of claim 1, wherein the circuitry is to deny the executable code segment to discover available resources based on one or more of: unaccepted client device identifier, unaccepted user identifier, unaccepted identifier of an application that issued the request, unaccepted header information in a packet that provided the request, unaccepted token provided with the request, unsuccessful decryption of the request, or unsuccessful access to the request based on a key value.

4. The apparatus of claim 1, wherein to discover available resources, the executable code segment is to query data that indicates available resources and corresponding performance capabilities.

5. The apparatus of claim 4, wherein to select a resource that satisfies performance requirements of the workload, the executable code segment is to select a resource based on performance requirements of the workload.

6. The apparatus of claim 4, wherein the available resources comprise one or more of: processors, graphics processing units, storage, memory, programmable control logic, field programmable gate arrays (FPGAs), artificial intelligence inference engines, image processing engine, or hardware-executed processes.

7. The apparatus of claim 1, wherein if the executable code segment fails to complete discovery and selection of a resource within a time limit, the circuitry is to provide a default resource selection to perform the workload.

8. The apparatus of claim 1, wherein the request to perform a workload comprises one or more of: an identifier of a task to perform, a reference to data to process or access in the task, security requirements, available requirements, or performance requirements of the task.

9. The apparatus of claim 8, wherein the performance requirements comprise one or more of: time latency, power cost, monetary cost, or application identifier.

10. The apparatus of claim 1, wherein the receiver and the circuitry are located in one or more of: a cellular transceiver, base station, access point, central office, or data center.

11. A non-transitory computer readable medium, comprising instructions stored thereon, that if executed by one or more processors, cause the one or more processors to:
selectively permit an executable code segment, received with a request to perform a workload, to execute on the one or more processors to discover available resources and to select a resource that satisfies performance requirements of the workload, wherein
to discover available resources, the executable code segment is to process data that indicates available resources and corresponding performance capabilities and
to select a resource that satisfies performance requirements of the workload, the executable code segment is to select a resource based on performance requirements of the workload.

12. The computer readable medium of claim 11, wherein the selectively permit an executable code segment, received with a request to perform a workload, to execute on the one or more processors to discover available resources is based on one or more of: client device identifier, user identifier, identifier of an application that issued the request, header information in a packet that provided the request, an accepted token provided with the request, successful decryption of the request, or successful access to the request based on a key value.

13. The computer readable medium of claim 11, comprising instructions stored thereon, that if executed by one or more processors, cause the one or more processors to:
deny the executable code segment to execute discover available resources based on one or more of: unaccepted client device identifier, unaccepted user identifier, unaccepted identifier of an application that issued the request, unaccepted header information in a packet that provided the request, unaccepted token provided with the request, unsuccessful decryption of the request, or unsuccessful access to the request based on a key value.

14. The computer readable medium of claim 11, wherein to discover available resources, the executable code segment is to query data that indicates available resources and corresponding performance capabilities.

15. The computer readable medium of claim 11, wherein to select a resource that satisfies performance requirements of the workload comprises select a resource based on performance requirements of the workload.

16. The computer readable medium of claim 11, wherein the available resources comprise one or more of: processors, graphics processing units, storage, memory, programmable control logic, field programmable gate arrays (FPGAs), artificial intelligence inference engines, image processing engine, or hardware-executed processes.

17. The computer readable medium of claim 11, comprising instructions stored thereon, that if executed by one or more processors, cause the one or more processors to:
   based on the executable code segment failing to complete discovery and selection of a resource within a time limit, provide a default resource selection to perform the workload.

18. The computer readable medium of claim 11, wherein the request to perform a workload comprises one or more of: an identifier of a task to perform, a reference to data to process or access in the task, security requirements, available requirements, or performance requirements of the task.

19. The computer readable medium of claim 18, wherein the performance requirements of the task comprise one or more of: time latency, power cost, monetary cost, or application identifier.

20. The computer readable medium of claim 11, wherein the one or more processors are located in one or more of: a cellular transceiver, base station, access point, central office, or data center.

21. The computer readable medium of claim 11, wherein the workload comprises a function as a service (FaaS).

22. The computer readable medium of claim 11, wherein the one or more processors are part of an edge gateway.

* * * * *